US010685512B2

(12) United States Patent
Feltham et al.

(10) Patent No.: US 10,685,512 B2
(45) Date of Patent: *Jun. 16, 2020

(54) WIRELESS LOCK

(71) Applicant: International Business Machines Corporation, Armonk, NY (US)

(72) Inventors: Andrew S. Feltham, Hampshire (GB); Elizabeth J. Maple, Hampshire (GB)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/384,288

(22) Filed: Apr. 15, 2019

(65) Prior Publication Data
US 2019/0244454 A1 Aug. 8, 2019

Related U.S. Application Data

(63) Continuation of application No. 15/258,516, filed on Sep. 7, 2016, now Pat. No. 10,354,464, which is a
(Continued)

(51) Int. Cl.
*G07C 9/00* (2020.01)
*H04W 84/12* (2009.01)
(Continued)

(52) U.S. Cl.
CPC ..... *G07C 9/00182* (2013.01); *G07C 9/00309* (2013.01); *H02J 7/0068* (2013.01);
(Continued)

(58) Field of Classification Search
CPC ............ G07C 9/00174; G07C 9/00182; G07C 9/00309; G07C 9/00571;
(Continued)

(56) References Cited

U.S. PATENT DOCUMENTS 5,625,349 A * 4/1997 Disbrow ............ G07C 9/00309
340/5.25
5,914,585 A 6/1999 Grabon
(Continued)

FOREIGN PATENT DOCUMENTS

CN 103114771 5/2013

OTHER PUBLICATIONS

List of WLAN channels, From Wikipedia, Retrieved on Nov. 3, 2015, https://wikipedia.org/wiki/List_of_WLAN_channels, 9 pages.
(Continued)

*Primary Examiner* — Orlando Bousono
(74) *Attorney, Agent, or Firm* — Schmeiser, Olsen & Watts, LLP; Isaac Gooshaw

(57) ABSTRACT

A network lock system and a method for operating the network lock system. The network lock system includes a lock mechanism and a device adapter for applying a power signal to a lock mechanism in which a bolt and a latch are locked together. The lock mechanism includes an electromagnet and a compressible spring. The power signal provides power to the electromagnet which causes the bolt to be attracted into the electromagnet by an electromagnetic force exceeding a compression force of a spring which causes the bolt to be released from the latch and causes the bolt to be surrounded by the electromagnet. Withdrawing the power signal from the lock mechanism removes the power provided to the lock mechanism which removes the electromagnetic force resulting in the compression force of the spring pushing the bolt into the latch causing the bolt and the latch to be locked together.

20 Claims, 5 Drawing Sheets

Related U.S. Application Data continuation of application No. 14/947,170, filed on Nov. 20, 2015, now Pat. No. 9,483,891.

(51) Int. Cl.
*H02J 50/10* (2016.01)
*H02J 7/00* (2006.01)
*H04W 12/06* (2009.01)

(52) U.S. Cl.
CPC ............ *H02J 50/10* (2016.02); *H04W 12/06* (2013.01); *H04W 84/12* (2013.01); *G07C 9/00912* (2013.01); *G07C 2009/0023* (2013.01); *G07C 2009/00769* (2013.01)

(58) Field of Classification Search
CPC ... G07C 2009/0023; G07C 2009/00634; H02J 50/10; H02J 7/0068; H04W 12/06; Y10T 70/7062
See application file for complete search history.

(56) References Cited

U.S. PATENT DOCUMENTS

| | | | |
|---|---|---|---|
| 6,486,793 B1 | 11/2002 | Buccola | |
| 6,577,497 B1 | 6/2003 | Kanevsky et al. | |
| 8,896,416 B1 | 11/2014 | Lundy et al. | |
| 8,922,333 B1* | 12/2014 | Kirkjan | G07C 9/00309 235/376 |
| 9,483,891 B1 | 11/2016 | Feltham et al. | |
| 9,607,458 B1* | 3/2017 | Schleiff | G07C 9/00031 |
| 2003/0160681 A1 | 8/2003 | Menard et al. | |
| 2005/0138356 A1 | 6/2005 | Hurwitz | |
| 2006/0164205 A1 | 7/2006 | Buckingham et al. | |
| 2006/0170533 A1 | 8/2006 | Chioiu et al. | |
| 2010/0073129 A1 | 3/2010 | Pukari | |
| 2010/0126240 A1 | 5/2010 | Pollabauer | |
| 2010/0148921 A1 | 6/2010 | Bliding et al. | |
| 2010/0326146 A1 | 12/2010 | Powers et al. | |
| 2010/0328031 A1 | 12/2010 | Powers et al. | |
| 2010/0332359 A1 | 12/2010 | Powers et al. | |
| 2011/0005282 A1 | 1/2011 | Powers et al. | |
| 2011/0311052 A1 | 12/2011 | Myers et al. | |
| 2012/0068817 A1* | 3/2012 | Fisher | G07C 9/00571 340/5.61 |
| 2012/0075062 A1* | 3/2012 | Osman | G07C 9/00087 340/5.61 |
| 2012/0075064 A1 | 3/2012 | Buckingham et al. | |
| 2013/0271069 A1 | 10/2013 | Partovi | |
| 2013/0271261 A1* | 10/2013 | Ribas | G08C 17/02 340/5.65 |
| 2013/0307987 A1 | 11/2013 | Luo et al. | |
| 2013/0335193 A1 | 12/2013 | Hanson et al. | |
| 2013/0342314 A1* | 12/2013 | Chen | G07C 9/00309 340/5.65 |
| 2014/0020437 A1* | 1/2014 | Bliding | E05B 49/00 70/283.1 |
| 2014/0022054 A1* | 1/2014 | Bliding | E05B 49/00 340/5.61 |
| 2014/0028438 A1* | 1/2014 | Kuenzi | G07C 9/00817 340/5.24 |
| 2014/0035722 A1* | 2/2014 | Kincaid | G07C 9/00111 340/5.61 |
| 2014/0051355 A1 | 2/2014 | Ahearn et al. | |
| 2014/0070003 A1* | 3/2014 | Radicella | G07C 9/00111 235/382 |
| 2014/0203078 A1* | 7/2014 | Radicella | G07C 9/00087 235/382 |
| 2014/0283018 A1* | 9/2014 | Dadu | G06F 21/70 726/19 |
| 2014/0340032 A1* | 11/2014 | Curtis | H04B 5/0037 320/108 |
| 2014/0340196 A1* | 11/2014 | Myers | G07C 9/00309 340/5.61 |
| 2014/0360232 A1* | 12/2014 | Al-Kahwati | G07C 9/00571 70/14 |
| 2014/0375422 A1* | 12/2014 | Huber | G07C 9/00174 340/5.61 |
| 2015/0332527 A1* | 11/2015 | Pukari | G07C 9/00119 70/277 |
| 2016/0049027 A1* | 2/2016 | Soldner | G07C 9/00174 340/5.61 |
| 2016/0097220 A1* | 4/2016 | Woodling | E05B 47/0603 70/278.7 |
| 2016/0116510 A1* | 4/2016 | Kalous | G01R 31/392 340/636.1 |
| 2017/0148242 A1 | 5/2017 | Feltham et al. | |

OTHER PUBLICATIONS

How do I change the Wi-Fi hotspot channel?, Retrieved on Nov. 3, 2015, Android Enthusiasts, Site design/logo copyright 2015 Stack Exchange Inc., 1 page.

Talla et al., Powering the Next Billion Devices with Wi-Fi, arXiv:1505.06815v1 [cs.NI] May 26, 2015, 14 pages.

Patricia Kelly, WiFi Backscatter Power to Battery-free Devices, http://forethought.net/wifi-backscatter-power/#.Vd3OVEYcyw8, Captured Aug. 26, 2015, 3 pages.

Office Action (dated Apr. 7, 2016) for U.S. Appl. No. 14/947,170, filed Nov. 20, 2015.

Amendment (dated Jun. 3, 2016) for U.S. Appl. No. 14/947,170, filed Nov. 20, 2015.

Notice of Allowance (dated Jul. 13, 2016) for U.S. Appl. No. 14/947,170, filed Nov. 20, 2015.

Office Action (dated Sep. 7, 2016) for U.S. Appl. No. 15/258,516, filed Sep. 7, 2016.

Amendment (dated Oct. 26, 2017) for U.S. Appl. No. 15/258,516, filed Sep. 7, 2016.

Final Office Action (dated Jan. 18, 2018) for U.S. Appl. No. 15/258,516, filed Sep. 7, 2016.

Final amendment (dated Sep. 7, 2016) for U.S. Appl. No. 15/258,516, filed Sep. 7, 2016.

Advisory Action (dated Apr. 25, 2018) for U.S. Appl. No. 15/258,516, filed Sep. 7, 2016.

RCE and amendment (dated May 24, 2018) for U.S. Appl. No. 15/258,516, filed Sep. 7, 2016.

Office Action (dated Jun. 25, 2018) for U.S. Appl. No. 15/258,516, filed Sep. 7, 2016.

Amendment (dated Sep. 24, 2018) for U.S. Appl. No. 15/258,516, filed Sep. 7, 2016.

Final Office Action (dated Dec. 3, 2018) for U.S. Appl. No. 15/258,516, filed Sep. 7, 2016.

Final amendment (dated Feb. 4, 2019) for U.S. Appl. No. 15/258,516, filed Sep. 7, 2016.

Notice of Allowance (dated Feb. 26, 2019) for U.S. Appl. No. 15/258,516, filed Sep. 7, 2016.

\* cited by examiner

WIRELESS LOCK

This application is a continuation application claiming priority to Ser. No. 15/258,516, filed Sep. 7, 2016, now U.S. Pat. No. 10,354,464, issued Jul. 16, 2019, which is a continuation of Ser. No. 14/947,170, filed Nov. 20, 2015, U.S. Pat. No. 9,483,891, issued Nov. 1, 2016.

TECHNICAL FIELD

The present invention relates to a wireless lock, and more specifically to a locking mechanism that can work with mobile devices to provide digital access to restricted areas.

BACKGROUND

It is known to use existing Wi-Fi networks to provide power to battery-free devices at a range of up to 20 feet.

SUMMARY

Embodiments of the present invention provide a network lock system and a method for operating the network lock system. The method includes: receiving a wireless signal from a wireless network device; converting the wireless signal into a power signal; and locking together a first lock part to a second lock part, or unlocking the first lock part locked to the second lock part, on application of the power signal to a lock mechanism that includes the first lock part and the second lock part.

BRIEF DESCRIPTION OF THE DRAWINGS

Embodiments of the present invention will now be described, by way of example only, with reference to the following drawings.

DETAILED DESCRIPTION

Figure 1:
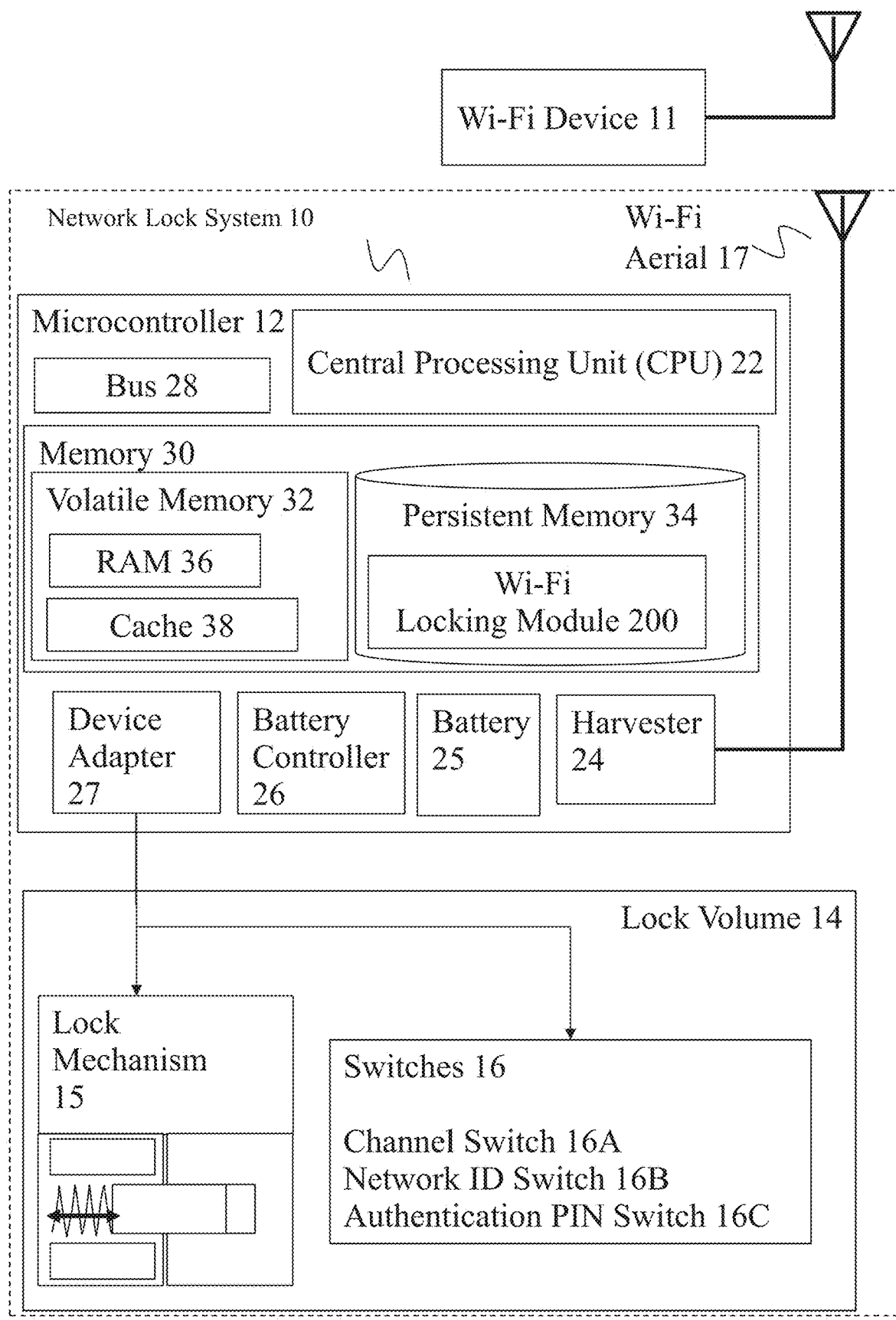
FIG. 1 is a diagram of an apparatus including a network lock system, in accordance with embodiments of the present invention.

FIG. 1 is a diagram of an apparatus including a network lock system 10, in accordance with embodiments of the present invention. The network lock system 10 is operational with respect to a microcontroller 12, but would be operational with numerous other general purpose or special purpose computing system environments or configurations.

Network lock system 10 includes: microcontroller 12; lock volume 14; lock mechanism 15; and switches 16. Network lock system 10 is connected to a wireless network via Wi-Fi aerial 17. The lock volume 14 includes the lock mechanism 15 and the switches 16. A Wi-Fi device 11 is not part of the defined network lock system 10 but is operative in one embodiment; for example, a mobile phone that is capable of creating a Wi-Fi network hotspot on a specific wireless channel with a network identifier and an authentication PIN.

In one embodiment, lock volume 14 is a safe with a door having lock mechanism 15 adapted to lock and unlock the door. Switches 16 are adapted to be accessible in the safe with the safe door unlocked and open, but to be inaccessible in the safe with the safe door closed and locked. In other embodiments, the switches 16 could be positioned in a door edge or elsewhere that is inaccessible except when the lock is unlocked and the safe door is open.

Lock mechanism 15 includes a first lock part and second lock part that may be locked together. In one embodiment, one part of the lock parts includes an electrically controllable bolt to engage in locking and unlocking and another part of the lock parts is a latch that is lockable with the bolt. In one embodiment, the controllable bolt includes an electromagnetic bolt that engages a latch on application of the power signal to a corresponding electromagnetic circuit (see example in FIGS. 5A, 5B and 5C). In another embodiment, the controllable bolt includes an electroactive polymer bolt that engages a latch on application of the power signal. In one embodiment, the lock parts are locked together or unlocked from each other after a threshold amount of energy has built up from the power signal. The energy is stored in battery 25.

Switches 16 include: channel switch 16A; network ID switch 16B; and authentication PIN switch 16C. Channel switch 16A is a set of micro-switches used by a user to set a Wi-Fi channel for a wireless signal to operate the network lock system 10. Network ID switch 16B is a set of micro-switches used by the user to set a Wi-Fi network for a wireless signal to operate the network lock system 10. Authentication PIN switch 16C is a set of micro-switches used by the user to set an authentication PIN for a wireless signal to operate the network lock system 10.

Wi-Fi aerial 17 comprises a loop antenna for receiving Wi-Fi signals. In one embodiment, the wireless signal is a Wi-Fi signal, and the Wi-Fi signal is converted into a power signal.

Microcontroller 12 may be described in the general context of computer system executable instructions, such as program modules, being executed by a computer processor. Generally, program modules may include: routines; programs; objects; components; logic; and data structures that perform particular tasks or implement particular data types.

Microcontroller 12 includes: central processing unit (CPU) 22; harvester 24; battery 25; battery controller 26; device adapter 27; bus 28 and memory 30.

CPU 22 loads machine instructions from memory 30 and performs machine operations in response to the instructions. Such machine operations include: incrementing or decrementing a value in a register; transferring a value from memory 30 to a register or vice versa; branching to a different location in memory if a condition is true or false (also known as a conditional branch instruction); and adding or subtracting the values in two different registers and loading the result in another register. A typical CPU can perform many different machine operations. A set of machine instructions is called a machine code program, the machine instructions are written in a machine code language which is referred to a low level language. A computer program written in a high level language needs to be compiled to a machine code program before it can be run. Alternatively a machine code program such as a virtual machine or an interpreter can interpret a high level language in terms of machine operations.

Harvester 24 is for receiving a wireless signal and also for converting a wireless signal into a power signal. Harvester 24 includes: a wireless signal receiver; a rectifier; and a direct current convertor. In one embodiment, harvester 24 can analyse a received wireless signal and convert the received wireless signal into a power signal at the same time. The rectifier is for converting a radio frequency signal (the Wi-Fi signal) into a direct current (a DC electrical current as opposed to an alternating current (AC)). The direct current convertor, for example a transformer, is for converting the rectified direct current to a voltage compatible with battery 25, microcontroller 12 and lock mechanism 15. Harvester 24 operates independently of the microcontroller 12 and is operational for converting wireless signals into power signals even when microcontroller 12 is turned off and not operating.

Battery 25 is for storing electricity from the power signal of harvester 24.

Battery controller 26 is for turning the microcontroller 12 on and off and can independently monitor battery 25 to determine if there is enough power and for turning on microcontroller 12 to enable the full functionality of network lock system 10. When there is enough power in the battery, the battery controller periodically turns on microcontroller 12.

Device adapter 27 is connected to lock mechanism 15 and switches 16 to enable communication among lock mechanism 15, switches 16, and microcontroller 12. For example, microcontroller 12 activates device adapter 27 with a lock signal and device adapter 27 applies a power signal to lock mechanism 15.

Bus 28 couples the main system components together including memory 30 to CPU 22.

Memory 30 includes computer system readable media in the form of volatile memory 32 and non-volatile or persistent memory 34. Examples of volatile memory 32 are random access memory (RAM) 36 and cache memory 38. Examples of persistent memory 34 are read only memory (ROM) and erasable programmable read only memory (EPROM). Generally, volatile memory is used because volatile memory is faster than non-volatile or persistent memory, and generally non-volatile memory or persistent memory is used because non-volatile memory or persistent memory will hold the data for longer periods of time than volatile memory. Network lock system 10 may further include other removable and/or non-removable, volatile and/or non-volatile computer system storage media. By way of example only, persistent memory 34 can be provided for reading from and writing to a non-removable, non-volatile magnetic media (not shown and, in some embodiments, a magnetic hard disk or solid-state drive). As will be further depicted and described below, memory 30 may include at least one program product having a set (for example, at least one) of program modules that are configured to carry out the functions of embodiments of the invention.

The program module configured to carry out the functions of embodiments of the present invention includes Wi-Fi locking module 200. In one embodiment, ROM in the memory 30 stores Wi-Fi locking module 200 that enables the microcontroller 12 to function as a special purpose computer specific to the Wi-Fi locking module 200. Further program modules that support embodiments of the present invention, but are not shown in FIG. 1, include firmware, boot strap program, operating system, and support applications.

Figure 2:
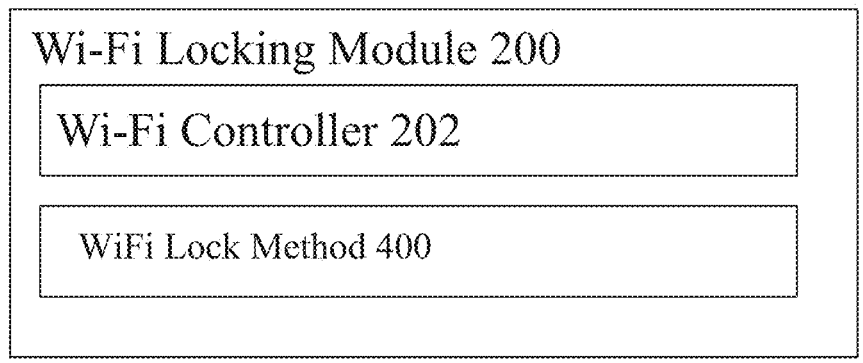
FIG. 2 is a diagram of a Wi-Fi locking module, in accordance with embodiments of the present invention.
Figure 4:
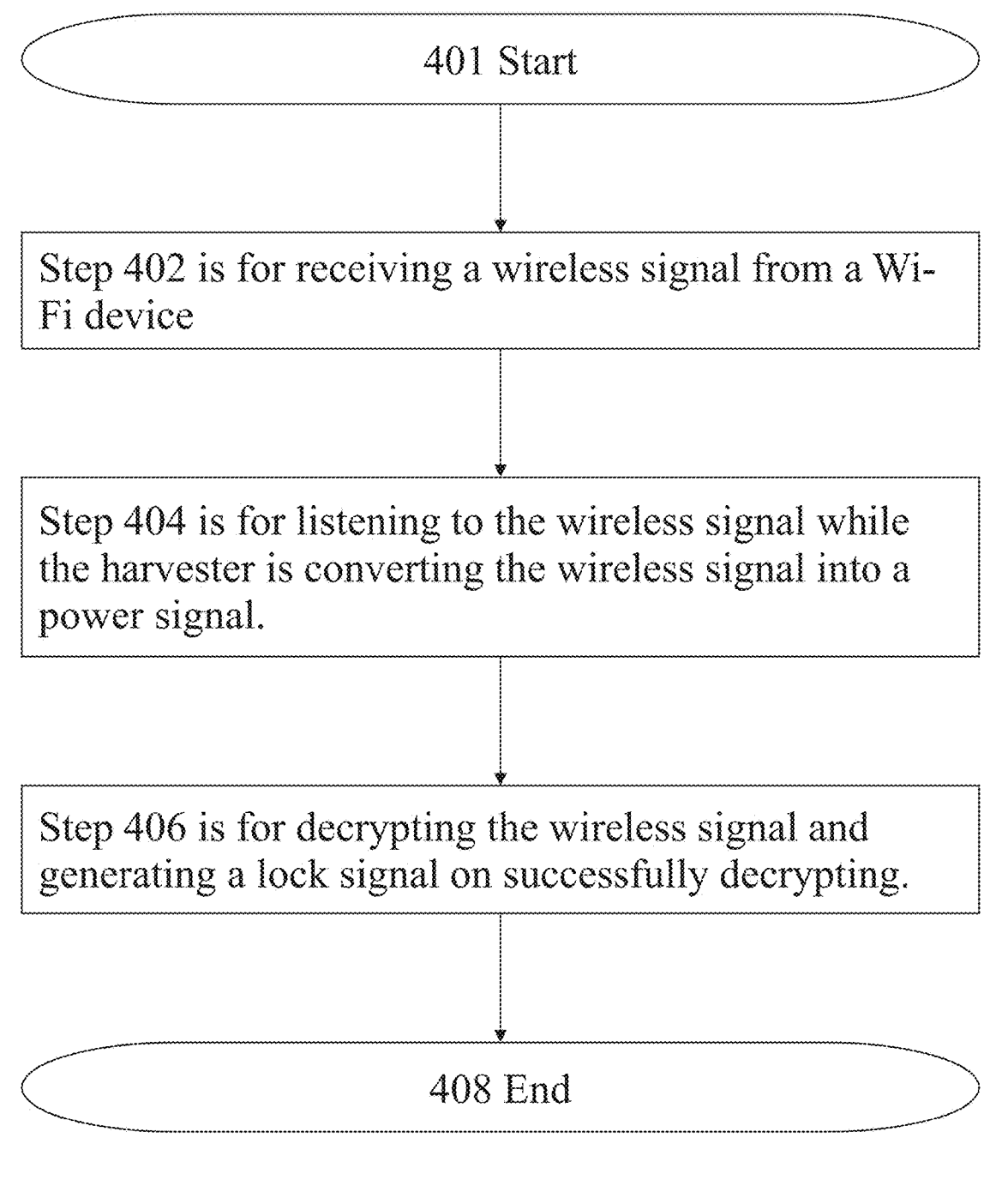
FIG. 4 is a flow diagram of a Wi-Fi lock method, in accordance with embodiments of the present invention.

FIG. 2 is a diagram of a Wi-Fi locking module 200, in accordance with embodiments of the present invention. The Wi-Fi locking module 200 includes: Wi-Fi controller 202; and Wi-Fi lock method 400. The Wi-Fi lock method 400 is depicted in FIG. 4, described infra.

Wi-Fi controller 202 is for receiving and decrypting the wireless signal. Wi-Fi controller 202 uses the value stored in the channel switch 16A to tune itself to receive a Wi-Fi signal on the correct channel. Wi-Fi controller 202 uses the value on network ID switch 16B to locate and receive an identified Wi-Fi signal. If there is an identified but encrypted Wi-Fi signal, then Wi-Fi controller 202 uses the authentication PIN from authentication PIN switch 16C to decrypt and receive the encrypted Wi-Fi signal. In response to the identified Wi-Fi signal having been successfully decoded, a lock signal is generated to activate the device adapter 27 and switch the lock mechanism 15 from locked to unlocked. To switch the lock mechanism 15 from unlocked to locked, the lock signal is withdrawn from the device adapter 27, and the power signal is withdrawn from the lock mechanism 15.

Figure 3:
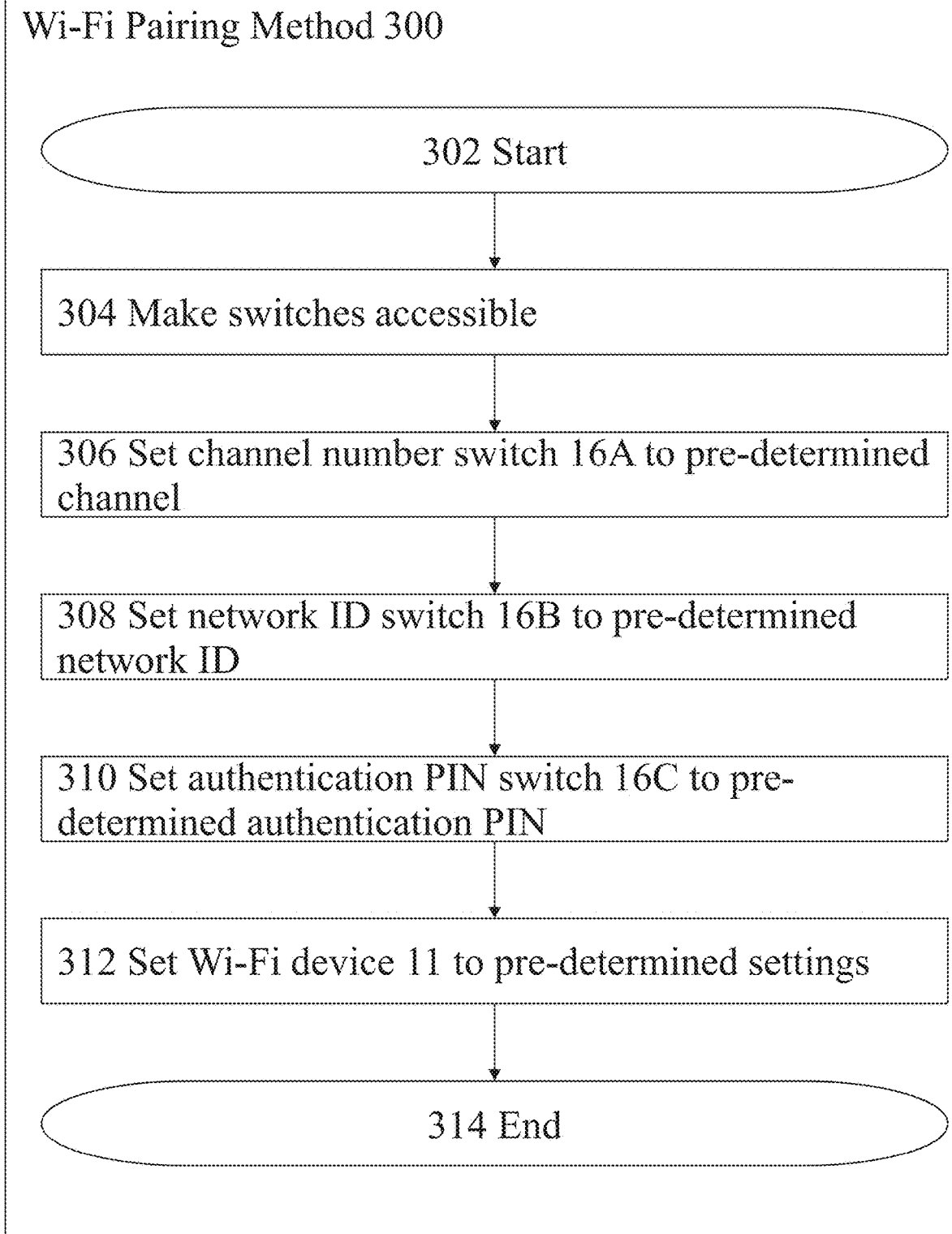
FIG. 3 is a flow diagram of a Wi-Fi pairing method, in accordance with embodiments of the present invention.

FIG. 3 is a flow diagram of a Wi-Fi pairing method 300, in accordance with embodiments of the present invention. The Wi-Fi pairing method 300 of FIG. 3 includes steps 302 to 314. Wi-Fi pairing method 300 is a user method and is not directly part of the network lock system 10. In order to ensure that only a restricted set of devices are able to unlock network lock system 10, a pairing state must be available that configures network lock system 10 and Wi-Fi device 11 to communicate with each other. Information is set in both network lock system 10 and Wi-Fi device 11, which can be done in a number of ways, and in one embodiment, by a user setting manual micro-switches on the inside of the lock volume 14 that are only accessible if lock mechanism 15 is opened. The shared information includes: wireless channel, wireless network ID; and an authentication PIN that will act as the 'key' to unlock the door.

Step 302 is the start of the pairing method when initiated by a user.

Step 304 is for making the switches accessible. One example of making the switches accessible is for the user to unlock network lock system 10 (if network lock system 10 is locked) to make switches on the inside of lock volume 14 accessible. In order to pair network lock system 10 with a Wi-Fi device 11, network lock system 10 needs to be open and the switches 16 made accessible. For example, the switches 16 can be on the inside of a door that opens when the lock is unlocked.

Step 306 is for the user to set channel switch 16A to a pre-determined channel.

Step 308 is for the user to set the network ID switch 16B to a pre-determined network ID.

Step 310 is for the user to set the authentication PIN switch 16C to a pre-determined authentication PIN.

Step 312 is for the user to set Wi-Fi device 11 settings to the pre-determined settings of switches 16A, 16B and 16C.

Step 314 is the end of the pairing process.

FIG. 4 is a flow diagram of a Wi-Fi lock method 400, in accordance with embodiments of the present invention. The Wi-Fi lock method 400 includes logical process steps 402 to 408. In Wi-Fi lock method 400, a user desires to unlock or lock the lock mechanism 15.

Step 401 is the start of the unlock or lock process.

Step 402 is for receiving a wireless signal from Wi-Fi device 11.

Step 404 is for listening to the wireless signal while harvester 24 is converting the wireless signal into a power signal. In one embodiment, the harvester 24 independently converts the Wi-Fi signal into a power signal and forwards the power signal to the battery 25. If the microcontroller 12 is on, the microcontroller 12 monitors the power signal and waits for a wireless signal that might be intended for the lock mechanism 15 before moving to the next step 406. In one embodiment, if the wireless signal is on the pre-determined channel and the pre-determined network, then the process moves to the next step 406.

Step 406 is for decrypting the wireless signal and generating a lock signal in response to successful decrypting. In one embodiment, the authentication PIN is used to decrypt the wireless signal on the pre-determined channel and pre-determined network. In response to successful decrypting, a lock signal is generated to lock or unlock the lock mechanism 15. The lock signal could be considered a power signal for direct application to the lock mechanism 15.

In one embodiment, Wi-Fi device 11 broadcasts a wireless signal on the predetermined channel and pre-determined network and encrypted with the pre-determined authentication PIN to switch the lock mechanism 15 from locked to unlocked and vice versa. The authentication PIN is not visible to other wireless devices on the same channel, because the authentication PIN is only used to encrypt and decrypt the wireless signal. In other embodiments, different authentication PINs can be used to specify locking and unlocking.

The pre-determined channel limits other wireless devices or network lock systems from being affected. In one embodiment, both the pre-determined network ID and pre-determined authentication PIN are used for more secure authentication, but in other embodiments, only the network ID need be used for less security. An embodiment is possible where no pre-determined switches are required, which would not be secure and would lock and unlock for any Wi-Fi signal.

Therefore, if the Wi-Fi signal is on a different channel, then there is no activation of the lock mechanism 15; the wireless signal is only converted into a power signal and stored. There is no activation of the lock mechanism 15 if the network is not on the pre-determined network or encrypted with the pre-determined authentication PIN. In one embodiment, the network is not used for any other network purposes (unlike that of a Wi-Fi router), and Wi-Fi device 11 can transmit at the fastest rate possible without impacting performance implications which will increase the power in the transmitted wireless signal and decrease the time needed for the lock to gain enough power.

In some embodiments, the power needed by the network lock system 10 will be larger than the power signal converted from the wireless signal, so the power signal charges the battery 25 without operating the microcontroller 12 and activating the lock mechanism 15. After a period of time, the battery 25 will have enough power to be able to start performing operations in network lock system 10.

The limited range of power over Wi-Fi and the default locked state means that it would not be trivial to hack the network lock system 10 remotely.

Step 408 is the end of Wi-Fi locking method 400.

Figure 5A:
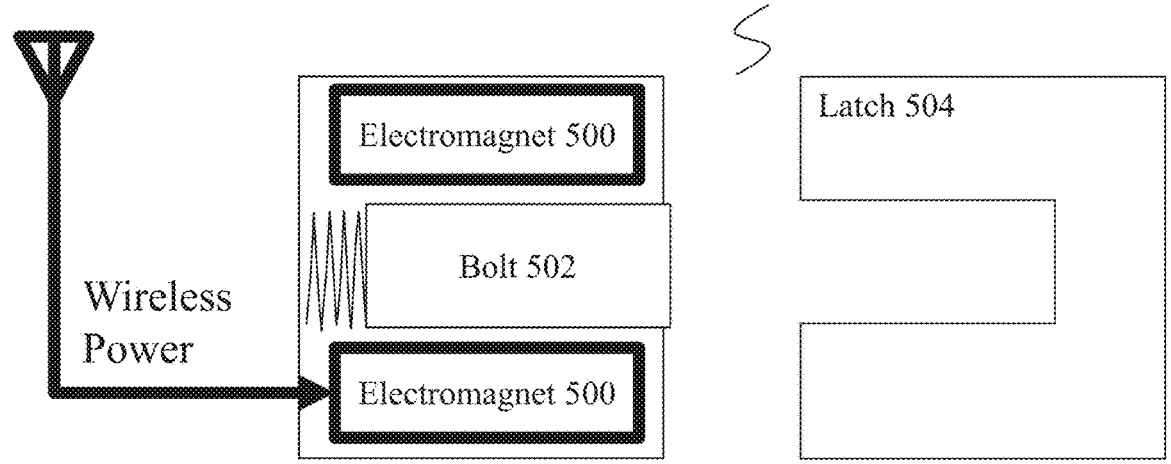
FIGS. 5A, 5B and 5C are schematic state diagrams of exemplary lock mechanisms, in accordance with embodiments of the present invention.
Figure 5B:
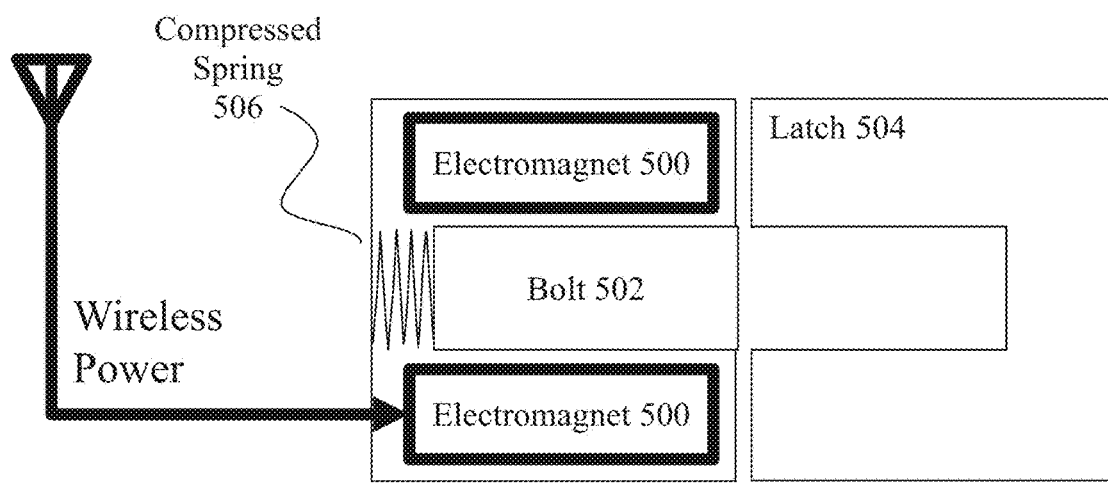
Figure 5C:
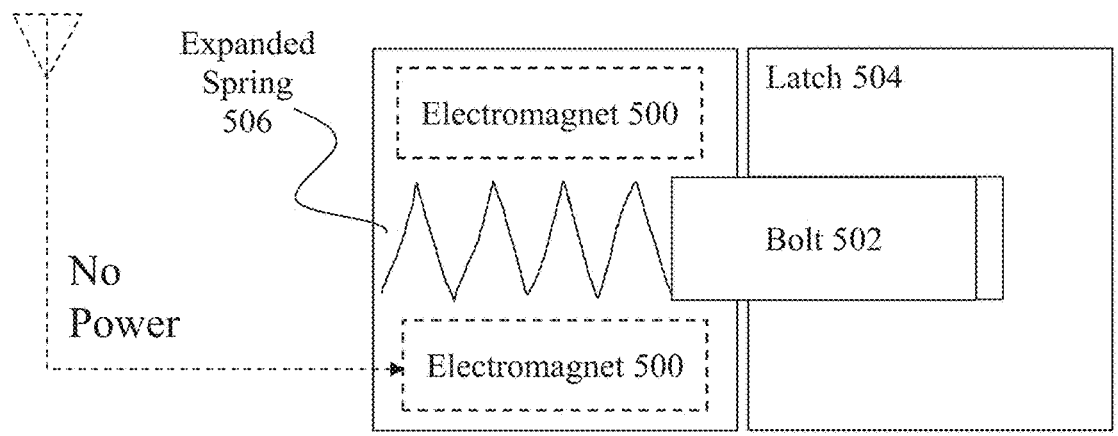

FIGS. 5A, 5B and 5C are schematic state diagrams of exemplary lock mechanisms 15, in accordance with embodiments of the present invention. Lock mechanism 15 includes: electromagnet 500, bolt 502; latch 504; and spring 506. Wi-Fi aerial 17 is only represented as connected directly to electromagnet 500 for the purpose of illustrating when wireless power is applied to the lock mechanism 15. In one embodiment, bolt 502 is pushed out by spring 506 when no current is applied to the electromagnet 500 such that the electromagnet 500 engages latch 504 and locks for lateral movement. If lock mechanism 15 is embedded in a door, then the door would be locked when no power is applied. In response to current being applied to the electromagnet 500, bolt 502 is pulled back against spring 506 which compresses the spring 506 and disengages bolt 502 from latch 504.

In FIG. 5A, lock mechanism 15 is in an unlocked and open state. A wireless signal is being received and converted into a power signal for application to the electromagnet 500 as represented by the thick line around Wi-Fi aerial 17 and electromagnet 500. The activated electromagnet 500 attracts bolt 502 back into the electromagnet 500 and against a biasing force of compressed spring 506. This disengages bolt 502 from latch 504 and unlocks the lock mechanism 15 whereby the lock can be opened as shown by the separation of the latch 504 from the electromagnet part of the lock.

In FIG. 5B, lock mechanism 15 is in an unlocked and closed state. Latch 504 and the electromagnet part of the lock are shown together. The wireless signal is still being received and converted into a power signal for application to the electromagnet 500 as represented by the thick line around Wi-Fi aerial 17 and electromagnet 500.

In FIG. 5C, lock mechanism 15 is shown in a locked and closed state. Latch 504 and the electromagnet part of the lock are shown together. Bolt 502 is now extended into the latch 504 to form a lock as forced by expanded spring 506 because there is no longer an electromagnetic force. The wireless signal is no longer being received and converted into a power signal for application to the electromagnet 500 as represented by the dashed line around Wi-Fi aerial 17 and electromagnet 500.

Further embodiments of the invention are now described. It will be clear to one of ordinary skill in the art that all or part of the logical process steps of the preferred embodiment may be alternatively embodied in a logic apparatus, or a plurality of logic apparatus, comprising logic elements arranged to perform the logical process steps of the method and that such logic elements may comprise hardware components, firmware components or a combination thereof.

It will be equally clear to one of skill in the art that all or part of the logic components of the preferred embodiment may be alternatively embodied in logic apparatus comprising logic elements to perform the steps of the method, and that such logic elements may comprise components such as logic gates in, for example, a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In a further alternative embodiment, the present invention may be realized in the form of a computer implemented method of deploying a service comprising steps of deploying computer program code operable to, when deployed into a computer infrastructure and executed thereon, cause the computer system to perform all the steps of the method.

Although embodiments of the present invention are described in terms of a microcontroller 12 in FIG. 1, many other computer system configurations are possible.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A computer program product of the present invention comprises a computer readable hardware storage device having computer readable program code stored therein, said program code containing instructions executable by a processor of a computer system to implement the methods of the present invention.

A computer system of the present invention comprises a processor, a memory, and a computer readable hardware storage device, said storage device containing program code executable by the processor via the memory to implement the methods of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It will be clear to one skilled in the art that many improvements and modifications can be made to the foregoing exemplary embodiment without departing from the scope of the present invention.

What is claimed is:

1. A method for operating a network lock system, said method comprising:
    applying, by a device adapter, a power signal to a lock mechanism in which a bolt and a latch are locked together, in response to the device adapter having been activated by a lock signal, wherein the lock mechanism comprises an electromagnet and a compressible spring having a compression force configured to push the bolt into the latch, wherein the power signal provides power to the electromagnet which causes the bolt to be attracted into the electromagnet by an electromagnetic force that exceeds the compression force of the spring which causes the bolt to be released from the latch and causes the bolt to be surrounded by the electromagnet; and
    withdrawing the power signal from the lock mechanism, which removes the power provided to the lock mechanism, said removal of the power provided to the lock mechanism removing the electromagnetic force resulting in the compression force of the spring pushing the bolt into the latch causing the bolt and the latch to be locked together.

2. The method of claim 1, said method further comprising:
    generating, by a microcontroller, a lock signal to activate the device adapter.

3. The method of claim 2, said method further comprising:
    prior to said generating the lock signal, turning on, by a battery controller using power in a battery, the microcontroller.

4. The method of claim 3, said method further comprising:
    converting, by a harvester, a first signal received from a network device into a second signal that inserts power into the battery, wherein the harvester operates independently of the microcontroller.

5. The method of claim 3, wherein the microcontroller comprises the device adapter, the battery controller, and the battery, and wherein the device adapter and the battery controller are distinct components within the microcontroller.

6. The method of claim 1, wherein the bolt comprises an electroactive polymer bolt.

7. The method of claim 1, said method further comprising:
    authenticating a wireless signal before applying the power signal to the lock mechanism, wherein said authenticating the wireless signal comprises decrypting an encrypted PIN from the wireless signal and matching the decrypted PIN with an authenticated PIN associated with the network lock system that comprises the lock mechanism.

8. A computer program product, comprising a computer readable hardware storage device having computer readable program code stored therein, said program code executable by a computer processor to implement a method for operating a network lock system, said method comprising:
    applying, by a device adapter, a power signal to a lock mechanism in which a bolt and a latch are locked together, in response to the device adapter having been activated by a lock signal, wherein the lock mechanism comprises an electromagnet and a compressible spring having a compression force configured to push the bolt into the latch, wherein the power signal provides power to the electromagnet which causes the bolt to be attracted into the electromagnet by an electromagnetic force that exceeds the compression force of the spring which causes the bolt to be released from the latch and causes the bolt to be surrounded by the electromagnet; and
    withdrawing the power signal from the lock mechanism, which removes the power provided to the lock mechanism, said removal of the power provided to the lock mechanism removing the electromagnetic force resulting in the compression force of the spring pushing the bolt into the latch causing the bolt and the latch to be locked together.

9. The computer program product of claim 8, said method further comprising:
    generating, by a microcontroller, a lock signal to activate the device adapter.

10. The computer program product of claim 9, said method further comprising:
    prior to said generating the lock signal, turning on, by a battery controller using power in a battery, the microcontroller.

11. The computer program product of claim 10, said method further comprising:
    converting, by a harvester, a first signal received from a network device into a second signal that inserts power into the battery, wherein the harvester operates independently of the microcontroller.

12. The computer program product of claim 10, wherein the microcontroller comprises the device adapter, the battery controller, and the battery, and wherein the device adapter and the battery controller are distinct components within the microcontroller.

13. The computer program product of claim 8, wherein the bolt comprises an electroactive polymer bolt.

14. The computer program product of claim 8, said method further comprising:
    authenticating a wireless signal before applying the power signal to the lock mechanism, wherein said authenticating the wireless signal comprises decrypting an encrypted PIN from the wireless signal and matching the decrypted PIN with an authenticated PIN associated with the network lock system that comprises the lock mechanism.

15. A network lock system, comprising:
    a lock mechanism; and
    a device adapter for applying a power signal to a lock mechanism in which a bolt and a latch are locked together, in response to the device adapter having been activated by a lock signal, wherein the lock mechanism comprises an electromagnet and a compressible spring having a compression force configured to push the bolt into the latch, and wherein the power signal provides power to the electromagnet which causes the bolt to be attracted into the electromagnet by an electromagnetic force that exceeds the compression force of the spring which causes the bolt to be released from the latch and causes the bolt to be surrounded by the electromagnet, and wherein withdrawing the power signal from the lock mechanism removes the power provided to the lock mechanism, said removal of the power provided to the lock mechanism removing the electromagnetic force resulting in the compression force of the spring pushing the bolt into the latch causing the bolt and the latch to be locked together.

16. The network lock system of claim 15, further comprising:
a microcontroller configured to generate a lock signal to activate the device adapter.

17. The network lock system of claim 16, further comprising:
a battery controller configured to turn on, using power in a battery, the microcontroller.

18. The network lock system of claim 17, further comprising:
a harvester for converting a first signal received from a network device into a second signal that inserts power into the battery, wherein the harvester operates independently of the microcontroller.

19. The network lock system of claim 17, wherein the microcontroller comprises the device adapter, the battery controller, and the battery, and wherein the device adapter and the battery controller are distinct components within the microcontroller.

20. The network lock system of claim 15, wherein the bolt comprises an electroactive polymer bolt.

* * * * *